(12) United States Patent
Han

(10) Patent No.: US 10,578,041 B1
(45) Date of Patent: Mar. 3, 2020

(54) METHOD OF PREDICTING AND CONTROLLING NOX GENERATION AMOUNT

(71) Applicants: Hyundai Motor Company, Seoul (KR); Kia Motors Corporation, Seoul (KR)

(72) Inventor: Kyoungchan Han, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/198,003

(22) Filed: Nov. 21, 2018

(30) Foreign Application Priority Data

Sep. 28, 2018 (KR) .................. 10-2018-0116159

(51) Int. Cl.
| | | |
|---|---|---|
| *F02D 41/14* | (2006.01) | |
| *F02D 35/02* | (2006.01) | |
| *F02D 41/40* | (2006.01) | |
| *F02D 41/00* | (2006.01) | |

(52) U.S. Cl.
CPC ....... *F02D 41/1462* (2013.01); *F02D 35/023* (2013.01); *F02D 41/0007* (2013.01); *F02D 41/1479* (2013.01); *F02D 41/401* (2013.01); *F02D 2200/023* (2013.01); *F02D 2200/024* (2013.01); *F02D 2200/04* (2013.01); *F02D 2200/0618* (2013.01); *F02D 2250/36* (2013.01)

(58) Field of Classification Search
CPC .......... F01N 11/007; F01N 11/00; F01N 3/18; F01N 9/00; F02D 41/0235; F02D 41/0072; F02D 41/1454; F02D 41/1462; F02D 41/0007; F02D 41/1479; F02D 41/401; F02D 2200/024; F02D 2200/0614; F02D 2200/0618; F02D 2200/101; F02D 2200/04; F02D 2200/023; F02D 2250/36; F02D 35/023; F02D 35/026; G01N 33/0037
See application file for complete search history.

(56) References Cited

U.S. PATENT DOCUMENTS

| | | | | |
|---|---|---|---|---|
| 5,592,919 | A * | 1/1997 | Morikawa | F02D 35/023 123/435 |
| 6,775,623 | B2 * | 8/2004 | Ali | F02D 41/1462 702/31 |

(Continued)

*Primary Examiner* — George C Jin
(74) *Attorney, Agent, or Firm* — Mintz Levin Cohn Ferris Glovsky and Popeo, P.C.; Peter F. Corless

(57) ABSTRACT

A method of predicting and controlling NOx generation amount is provided. The method includes calculating a difference between an actual and a reference NOx exhaust amount and analyzing influence of the in-cylinder pressure at a combustion start time, an oxygen amount in EGR gas, and a fuel injection timing. A NOx rate of change is calculated based on change in the in-cylinder pressure at the combustion start time, the oxygen amount in the EGR gas, and the fuel injection timing. A variation width and a NOx value are calculated at the combustion start time, the oxygen amount in the EGR gas, and the fuel injection timing. The NOx value is adjusted based on the NOx value adjustment amount and a NOx final value is determined. A target boost pressure, a target oxygen amount, and a target fuel injection timing are determined to provide a final command signal.

13 Claims, 9 Drawing Sheets

(56) References Cited

U.S. PATENT DOCUMENTS

| | | | |
|---|---|---|---|
| 8,161,944 B2* | 4/2012 | Moriya | F01N 3/0814 |
| | | | 123/435 |
| 2013/0131954 A1* | 5/2013 | Yu | F02D 41/1462 |
| | | | 701/102 |
| 2013/0131967 A1* | 5/2013 | Yu | F02D 41/1462 |
| | | | 701/115 |
| 2017/0167350 A1* | 6/2017 | Han | F02D 41/1462 |

* cited by examiner

METHOD OF PREDICTING AND CONTROLLING NOX GENERATION AMOUNT

CROSS-REFERENCE TO RELATED APPLICATION

This application claims priority to and the benefit of Korean Patent Application No. 10-2018-0116159 filed on Sep. 28, 2018, the entire contents of which are incorporated herein by reference.

BACKGROUND

(a) Field of the Invention

The present invention relates to a method of predicting and controlling NOx generation amount of a diesel engine, and more particularly, to a method that more accurately predict the amount of the NOx in real time without using a separate exhaust analyzer or a NOx measuring sensor by using combustion pressure and engine driving parameters.

(b) Description of the Related Art

The existing internal combustion engine (e.g., a diesel engine) is developed and mass-produced with unpredictable NOx emissions. However, an expensive NOx post-treatment device such as selective catalytic reduction (SCR) system is mounted on the vehicle to prevent NOx from being discharged since NOx amount is measured and regulated at various driving and environmental conditions according to enhanced exhaust regulations.

There are commercial NOx sensors that measure NOx emissions from the engine, but there are some disadvantages. Sensor heating time is required, and thus, the initial NOx measurement of the engine is unable to be started, and the discharged NOx is unable to be measured immediately. Additionally, the known NOx prediction technology and control technology are based on the difference of the actual value with respect to the target value of the exhaust gas recirculation (EGR) amount, and are insufficient to cope with future exhaust regulations such as real-driving emissions (RDE).

The above information disclosed in this section is merely for enhancement of understanding of the background of the invention and therefore it may contain information that does not form the prior art that is already known in this country to a person of ordinary skill in the art.

SUMMARY

The present invention provides a method of predicting and controlling NOx generation amount of a diesel engine which may more accurately predict the amount of the NOx in real time without using a separate exhaust analyzer or a NOx measuring sensor by using combustion pressure and engine driving parameters.

A method of predicting and controlling NOx generation amount according to an exemplary embodiment of the present invention may include calculating a difference between an actual NOx exhaust amount and a reference NOx exhaust amount, analyzing influence of the in-cylinder pressure at a start time of combustion, an oxygen amount in EGR gas, and a fuel injection timing, calculating a rate of change in the NOx based on change in the in-cylinder pressure at the start time of combustion, the oxygen amount in the EGR gas, and the fuel injection timing, calculating variation width that may be changed in a unit time per the in-cylinder pressure at the combustion start time, the oxygen amount in the EGR gas, and the fuel injection timing, calculating a NOx value adjustment amount that may be changed in the unit time based on the influence of the in-cylinder pressure at the combustion start time, the oxygen amount in the EGR gas, and the fuel injection timing, adjusting the NOx value based on the NOx value adjustment amount and determining a NOx final value, and determining a target boost pressure, a target oxygen amount, and a target fuel injection timing to provide a final command signal.

The calculating of a difference between an actual NOx exhaust amount and a reference NOx exhaust amount may include determining reference oxygen amount, an in-cylinder pressure at the start time of a reference combustion, a reference injection timing, and a reference combustion maximum pressure, calculating a reference combustion maximum temperature based on the in-cylinder pressure at the reference combustion start time, the reference combustion maximum pressure, and the reference oxygen amount, determining a reference NOx exhaust amount based on the reference combustion maximum temperature and the reference oxygen amount, calculating a difference value between an actual oxygen amount and the reference oxygen amount, calculating a difference value between an in-cylinder pressure at the start time of actual combustion and the in-cylinder pressure at the start time of the reference combustion, calculating a difference value between an actual injection timing and the reference injection timing, calculating an actual combustion maximum temperature based on the in-cylinder pressure at the actual combustion start time, an actual combustion maximum pressure, and the actual oxygen amount, calculating an actual NOx exhaust amount based on the actual combustion maximum temperature and the actual oxygen amount, and calculating a difference value between the calculated actual NOx exhaust amount and the calculated reference NOx exhaust amount.

The analyzing of the influence of the in-cylinder pressure at a start time of combustion, an oxygen amount in EGR gas, and a fuel injection timing may include calculating a first actual flame temperature at the in-cylinder pressure at the start time of combustion based on the in-cylinder pressure at the start time of the actual combustion, the reference combustion maximum pressure, and the reference oxygen amount, calculating a first actual NOx exhaust amount at the in-cylinder pressure at the start time of combustion based on the first actual flame temperature and the reference oxygen amount, calculating a second actual flame temperature at the actual oxygen amount based on the in-cylinder pressure at the reference combustion start time, the reference combustion maximum pressure, and the actual oxygen amount, calculating a second actual NOx exhaust amount at the actual oxygen amount based on the second actual flame temperature and the actual oxygen amount, calculating a third actual flame temperature at the actual combustion maximum pressure based on the in-cylinder pressure at the reference combustion start time and the actual combustion maximum pressure, and calculating a third actual NOx exhaust amount at the actual combustion maximum pressure based on the third actual flame temperature and the reference oxygen amount.

The calculating of a rate of change in the NOx based on change in the in-cylinder pressure at the start time of combustion, the oxygen amount in the EGR gas, and the fuel injection timing may include calculating a change amount of the actual NOx exhaust amount with respect to a change amount of the in-cylinder pressure at the actual combustion start time, calculating a change amount of the actual NOx exhaust amount with respect to a change amount of the actual oxygen amount, and calculating a change amount of the actual NOx exhaust amount with respect to a change amount of the actual injection timing.

The calculating of the variation width that may be changed in a unit time per the in-cylinder pressure at the combustion start time, the oxygen amount in the EGR gas, and the fuel injection timing may include calculating time based on vehicle speed per unit time and fuel consumption per unit time, calculating a rate of change of the in-cylinder pressure at the start time of combustion based on an engine speed, a total fuel amount, and the in-cylinder pressure at the start time of the actual combustion, and calculating the change amount in the in-cylinder pressure at the start time of combustion by multiplying the time by the rate of change of the in-cylinder pressure at the start time of combustion, calculating a rate of change of the actual oxygen amount based on the engine speed, the total fuel amount, and the actual oxygen amount, and calculating a change amount of the oxygen amount by multiplying the time by the rate of change of the actual oxygen amount, and calculating a rate of change of an actual injection timing based on the engine speed, the total fuel amount, and the actual injection timing, and calculating a change amount of the injection timing by multiplying the time by the rate of change of an actual injection timing.

The calculating of a NOx value adjustment amount that may be changed in the unit time in consideration of the influence of the in-cylinder pressure at the combustion start time, the oxygen amount in the EGR gas, and the fuel injection timing may include determining whether a difference value between the actual NOx exhaust amount and the reference NOx exhaust amount is greater than 0. When the difference value between the actual NOx exhaust amount and the reference NOx exhaust amount is greater than 0, the NOx value adjustment amount that may be changed in unit time based on the in-cylinder pressure at the start time of combustion may be determined by multiplying the NOx change amount by the change amount of the in-cylinder pressure at the start time of combustion by the minimum change amount of the in-cylinder pressure at the start time of combustion, the NOx value adjustment amount that may be changed in unit time based on the oxygen amount may be determined by multiplying the NOx change amount by the oxygen amount change amount by the maximum change amount of the oxygen amount, and the NOx value adjustment amount that may be changed in unit time considering the injection timing may be determined by multiplying the NOx change amount by the injection amount change amount by the maximum change amount of the injection time.

Additionally, when the difference between the actual NOx exhaust amount and the reference NOx exhaust amount is less than 0, the NOx value adjustment amount that may be changed in unit time based on the in-cylinder pressure at the start time of combustion may be determined by multiplying the NOx change amount by the change amount of the in-cylinder pressure at the start time of combustion by the maximum change amount of the in-cylinder pressure at the start time of combustion, the NOx value adjustment amount that may be changed in unit time considering the oxygen amount may be determined by multiplying the NOx change amount by the oxygen amount change amount by the minimum change amount of the oxygen amount, and the NOx value adjustment amount that may be changed in unit time based on the injection timing may be determined by multiplying the NOx change amount by the injection amount change amount by the minimum change amount of the injection time.

The adjusting of the NOx value based on the NOx value adjustment amount and determining a NOx final value may include determining whether the NOx value may be adjusted by changing the in-cylinder pressure at the start time of combustion. When the NOx value is capable of being adjusted by changing the in-cylinder pressure at the start time of combustion, the desired change amount of the in-cylinder pressure at the combustion start time may be determined to be equal to the change amount of the in-cylinder pressure at the combustion start time, the desired oxygen change amount may be determined to be zero, and the desired injection timing change amount may be determined to be 0.

Further, when the NOx value is unable to be adjusted by changing the in-cylinder pressure at the start time of combustion, the method may include determining whether the NOx value may be adjusted by changing the in-cylinder pressure and the oxygen amount at the start of combustion. When the NOx value is capable of being adjusted by changing the in-cylinder pressure and the oxygen amount at the start of combustion, the desired change amount of the in-cylinder pressure at the combustion start time may be determined to be equal to the change amount of the in-cylinder pressure at the combustion start time, the desired oxygen change amount may be determined to be current oxygen change amount, and the desired injection timing change amount may be determined to be 0.

When the NOx value is unable to be adjusted by changing the in-cylinder pressure and the oxygen amount at the start of combustion, the desired change amount of the in-cylinder pressure at the combustion start time may be determined to be equal to the change amount of the in-cylinder pressure at the combustion start time, the desired oxygen change amount may be determined to be current oxygen change amount, the desired injection timing change amount may be calculated by calculating the difference between the NOx change amount and the NOx shift amount due to the in-cylinder pressure at the start time of combustion and the oxygen amount and inversely calculating the injection timing change amount with respect to the difference, the actual injection timing, the engine speed, and the load. The injection timing change amount may be limited through a comparison with a changeable threshold value, and finally may be determined in consideration of the fuel consumption deterioration limit value.

The determination of a target boost pressure, a target oxygen amount, and a target fuel injection timing to provide a final command signal may include determining the target boost pressure based on an actual boost pressure, the change amount of the desired in-cylinder pressure at the start time of the combustion, and the cooling water temperature, determining the target oxygen amount based on the actual oxygen amount and the desired oxygen change amount, and determining the desired target injection timing based on an actual injection timing and the desired injection timing change amount. According to an exemplary embodiment of the present invention, it may be possible to operate the engine in real time in response to emission (EM) regulation by real-time prediction of NOx emission using combustion pressure sensor.

BRIEF DESCRIPTION OF THE DRAWINGS

The above and other objects, features and advantages of the present disclosure will be more apparent from the following detailed description taken in conjunction with the accompanying drawings.

DESCRIPTION OF SYMBOLS

Figure 1:
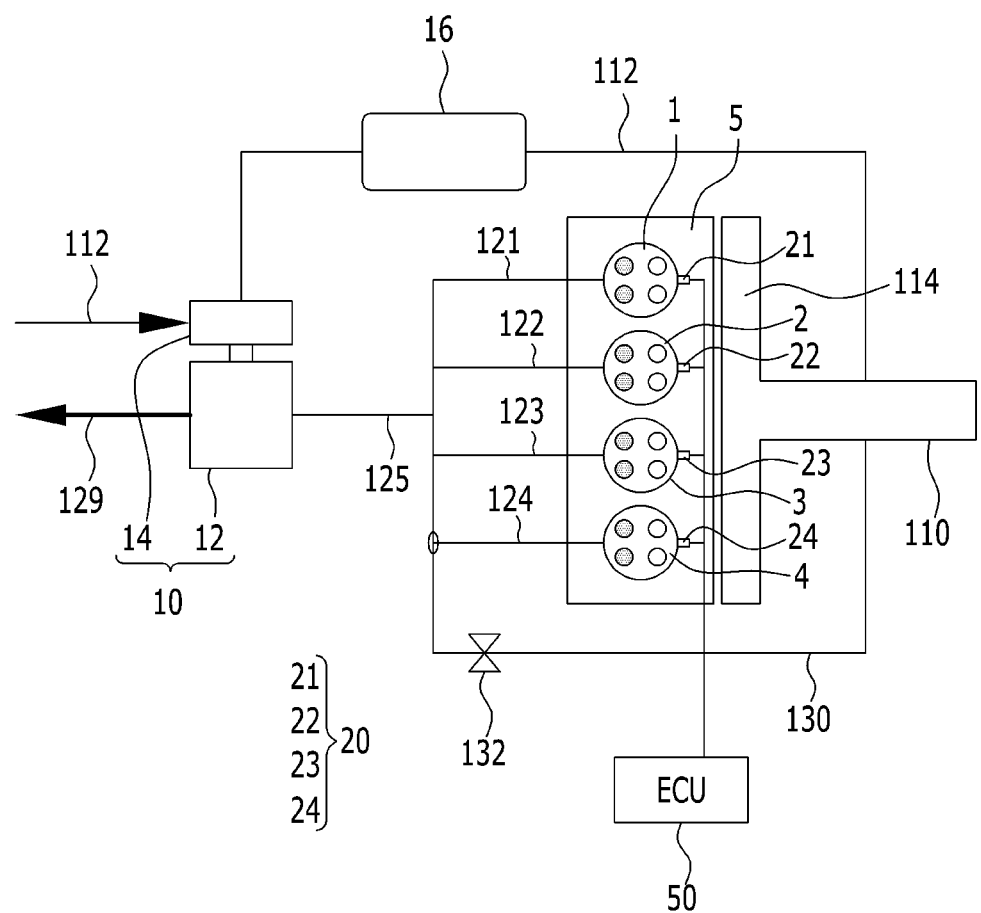
FIG. 1 is a configuration diagram of an engine system according to an exemplary embodiment of the present invention.

1: first cylinder
2: second cylinder
3: third cylinder
4: fourth cylinder
5: engine
10: turbocharger
12: turbine
14: compressor
16: intercooler
50: controller
110: intake passage
112: intake circuit
114: intake manifold
121: first exhaust passage
122: second exhaust passage
123: third exhaust passage
124: fourth exhaust passage
125: first exhaust manifold
127: second exhaust manifold
129: exhaust outlet
130: recirculation exhaust gas passage
132: recirculation valve

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described more fully with reference to the accompanying drawings, in which exemplary embodiments of the invention are shown. As those skilled in the art would realize, the described exemplary embodiments may be modified in various different ways, all without departing from the spirit or scope of the present invention. Further, in exemplary embodiments, since like reference numerals designate like elements having the same configuration, a first exemplary embodiment is representatively described, and in other exemplary embodiments, only configurations different from the first exemplary embodiment will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. In addition, same structures, elements, or components illustrated in two or more drawings use same reference numerals for showing similar features. It will be understood that when an element such as a layer, film, region, or substrate is referred to as being "on" another element, it can be directly on the other element or intervening elements may also be present.

The exemplary embodiment of the present invention shows an exemplary embodiment of the present invention in detail. As a result, various modifications of the drawings will be expected. Therefore, the exemplary embodiment is not limited to a specific aspect of the illustrated region, and for example, includes modifications of an aspect by manufacturing.

An engine system according to an exemplary embodiment of the present invention will be described with reference to FIG. 1. Referring to FIG. 1, an engine system according to an exemplary embodiment of the present invention may include an intake passage 110, an intake manifold 114, an engine 5, a first cylinder 1, a second cylinder 2, a third cylinder 3, a fourth cylinder 4, a first exhaust passage 121, a second exhaust passage 122, a third exhaust passage 123, a fourth exhaust passage 124, a first exhaust manifold 125, a second exhaust manifold 127, a turbocharger 10, an exhaust outlet 129, an intake circulation passage 112, an intercooler 16, a recirculation exhaust gas passage 130, a recirculation valve 132, a combustion pressure sensor 20, and a controller 50.

The intake passage 110 is a passage through which the outside air may be suctioned based on the amount of opening of a typical throttle valve (not shown). The intake manifold 114 may be formed to supply the air suctioned through the intake passage 110 to the cylinders 1, 2, 3 and 4 of the engine 5. The engine 5 may include four cylinders composed of a first cylinder 1, a second cylinder 2, a third cylinder 3, and a fourth cylinder 4. The engine 5 having the first, second, third and fourth cylinders 1, 2, 3 and 4 is exemplarily described in the exemplary embodiment of the present invention, but the number of the cylinders of the engine 5 is not limited thereto. In particular, the numbers of the first, second, third and fourth cylinders 1, 2, 3 and 4 refer to the order from the front of the engine 5.

The first exhaust passage 121 may communicate with the first cylinder 1 and may be configured to receive the exhaust gas from the first cylinder 1. The second exhaust passage 122 may communicate with the second cylinder 2 and may be configured to receive the exhaust gas from the second cylinder 2. The third exhaust passage 123 may communicate with the third cylinder 3 and may be configured to receive the exhaust gas from the third cylinder 3. The fourth exhaust passage 124 may communicate with the fourth cylinder 4 and may be configured to receive the exhaust gas from the fourth cylinder 4. The first exhaust manifold 125 and the second exhaust manifold 127 may collect exhaust gases of the cylinders 1, 2, 3, 4 and discharge the gases.

The turbocharger 10 may be configured to rotate the turbine 12 with the energy of the exhaust gas and the compressor 14 directly connected to the turbine 12 may be configured to push the supercharging air to the cylinders 1, 2, 3, and 4 to improve output of the engine 5. Further, the exhaust gas passed through the first exhaust manifold 125 and the second exhaust manifold 127 may also be supplied to rotate the turbine 12 of the turbocharger 10. The exhaust outlet 129 may discharge the exhaust gas passed through the turbine 12 to the outside.

The intake circulation passage 112 may communicate with the intake passage 110 via the compressor 14 of the turbocharger 10. In addition, the outside air flowing into the intake circulation passage 112 may pass through the compressor 14 and become high-temperature supercharged air. The intercooler 16 may be disposed in the intake circulation passage 112 to cool the high temperature supercharged air formed by the compressor 14. In other words, the outside air flowing into the intake circulation passage 112 may communicate with the intake passage 110 sequentially through the compressor 14 and the intercooler 16.

A first end of the recirculation exhaust gas passage 130 may be in communication with one of the exhaust passages 121, 122, 123, 124 and the first exhaust manifold 125 through which the exhaust gas of the cylinders 1, 2, 3 and 4 passes, to recirculate some of the exhaust gases of the cylinders 1, 2, 3 and 4. Further, a second end of the recirculated exhaust gas passage 130 may communicate with the intake passage 110, to recirculate some of the exhaust gases of the cylinders 1, 2, 3 and 4. The recirculation valve 132 may be disposed on the recirculation exhaust gas passage 130. Further, the recirculation valve 132 may be configured to selectively open or close the recirculation exhaust gas passage 130 to selectively supply a part of the exhaust gas of the cylinders 1, 2, 3 and 4 to the intake passage 110 based on the state of the engine 5 and the driving state of the vehicle.

The combustion pressure sensor 20 may be disposed in the cylinders 1, 2, 3 and 4. The combustion pressure sensor 20 may be disposed in all of the cylinders 1, 2, 3 and 4, or may be disposed in only some cylinders. The combustion pressure sensor may be configured to measure the combustion pressure inside the cylinder. The controller 50 may be connected to the recirculation valve 132 and the combustion pressure sensor to operate the recirculation valve 132 and may be configured to predict the amount of NOx generation amount according to an exemplary embodiment of the present invention using the combustion pressure and the driving parameters of the engine. The recirculation valve 132 may be electrically operated by a solenoid or the like and the controller 50 may be a conventional electronic control unit (ECU) configured to operate the electrical devices of the vehicle.

Figure 2:
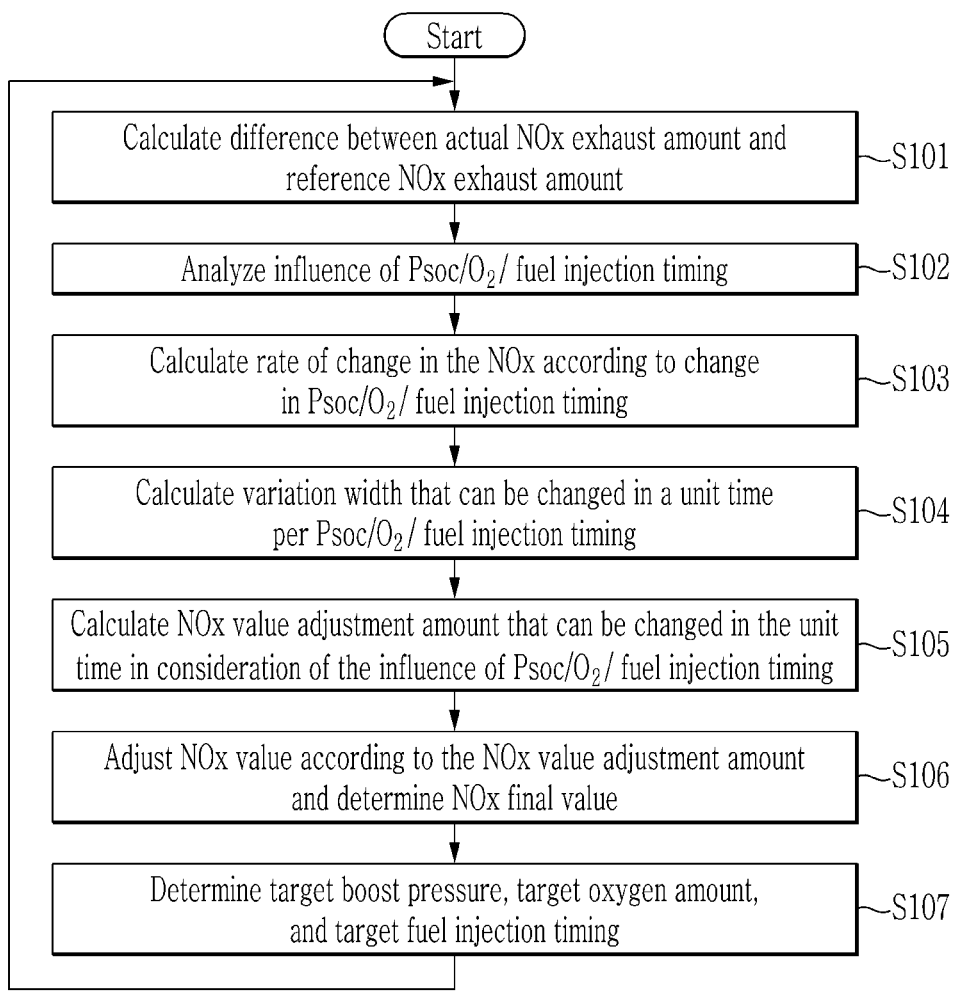
FIG. 2 is a flowchart illustrating a method of predicting and controlling NOx amount according to an exemplary embodiment of the present invention.

FIG. 2 is a flowchart illustrating a method of predicting and controlling NOx amount according to an exemplary embodiment of the present invention. Referring to FIG. 2, a method of predicting and controlling NOx generation amount according to an exemplary embodiment of the present invention may include calculating a difference between an actual NOx exhaust amount and a reference NOx exhaust amount S101.

Then, influence of the in-cylinder pressure Psoc at a start time of combustion, an oxygen amount $O_2$ in EGR gas, and a fuel injection timing MFB50 may be analyzed S102. A rate of change in the NOx according to change in the in-cylinder pressure Psoc at the start time of combustion, the oxygen amount $O_2$ in the EGR gas, and the fuel injection timing MFB50 may then be calculated S103. Variation width that may be changed in a unit time per the in-cylinder pressure Psoc at the combustion start time, the oxygen amount $O_2$ in the EGR gas, and the fuel injection timing MFB50 may be calculated S104.

Further, a NOx value adjustment amount that may be changed in the unit time based on the influence of the in-cylinder pressure Psoc at the combustion start time, the oxygen amount $O_2$ in the EGR gas, and the fuel injection timing MFB50 may be calculated S105. The NOx value based on the NOx value adjustment amount may be adjusted and a NOx final value may be determined S106. A target boost pressure, a target oxygen amount, and a target fuel injection timing may be determined to provide a final command signal S107.

Figure 3:
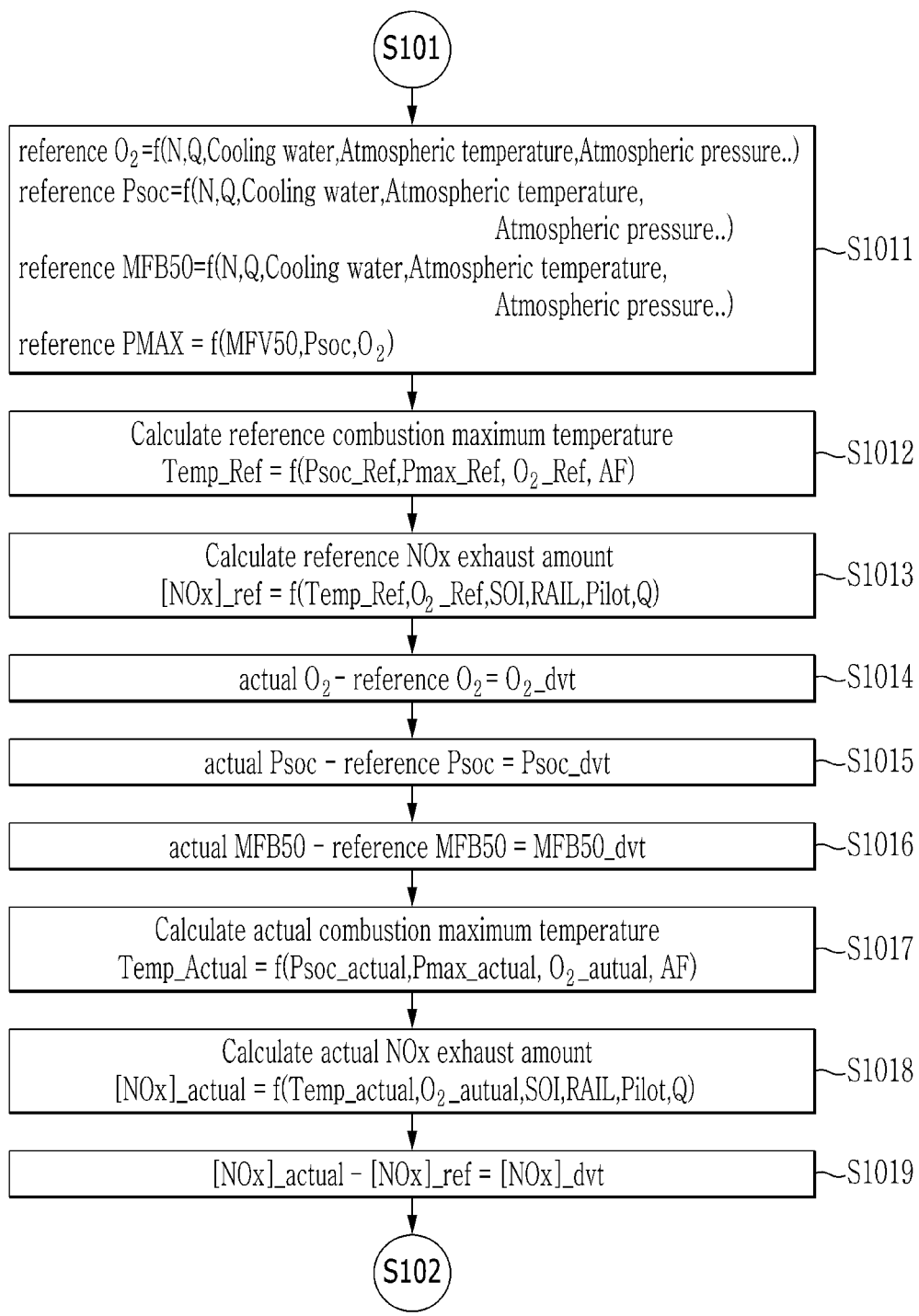
FIG. 3 is a flowchart illustrating a specific method of calculating a difference between actual NOx exhaust amount and reference NOx exhaust amount according to an exemplary embodiment of the present invention shown in FIG. 2.

Hereinafter, a specific method of each step of FIG. 2 will be described with reference to FIGS. 3 to 9. FIG. 3 is a flowchart illustrating a specific method of calculating a difference between actual NOx exhaust amount and reference NOx exhaust amount S101 according to an exemplary embodiment of the present invention shown in FIG. 2. Referring to FIG. 3, in the calculating a difference between an actual NOx exhaust amount and a reference NOx exhaust amount S101, a reference oxygen amount (reference $O_2$), an in-cylinder pressure at the start time of a reference combustion (reference Psoc), a reference injection timing (reference MFB50), and a reference combustion maximum pressure (reference Pmax) may be determined S1011.

The reference oxygen amount (reference $O_2$), the in-cylinder pressure at the start time of a reference combustion (reference Psoc), and the reference injection timing (reference MFB50) may be determined in advance using engine speed N, the total fuel amount Q, the cooling water temperature, the atmospheric temperature, the atmospheric pressure, and the like, and the reference combustion maximum pressure (reference Pmax) may be determined in advance by the injection timing (MFB50), the reference combustion maximum pressure (reference Pmax), and the oxygen amount ($O_2$).

A reference combustion maximum temperature (Temp_Ref) may be calculated based on the in-cylinder pressure at the reference combustion start time (Psoc_Ref), the reference combustion maximum pressure (Pmax_Ref), and the reference oxygen amount ($O_2$_Ref) S1012. The calculation of the reference combustion maximum temperature (Temp_Ref) may also consider the air-fuel ratio (AF). A reference NOx exhaust amount ([NOx]_ref) may be determined based on the reference combustion maximum temperature (Temp_Ref) and the reference oxygen amount ($O_2$_Ref) S1013. The reference NOx exhaust amount ([NOx]_ref) may be determined by considering a start of injection (SOI), a rail pressure (injection pressure; RAIL), an auxiliary injection (Pilot), and total Fuel amount (Q) with the reference combustion maximum temperature (Temp_Ref) and the reference oxygen amount ($O_2$_Ref).

Further, a difference value between an actual oxygen amount (actual $O_2$) and the reference oxygen amount (reference $O_2$) may be calculated S1014. A difference value between an in-cylinder pressure at the start time of actual combustion (actual Psoc) and the in-cylinder pressure at the start time of the reference combustion (reference Psoc) may be calculated S1015. Additionally, a difference value (MFB50_dvt) between an actual injection timing (actual MFB50) and the reference injection timing (reference MFB50) may be calculated S1016. Then, an actual combustion maximum temperature (Temp_actual) may be calculated based on the in-cylinder pressure at the actual combustion start time (Psoc_actual), an actual combustion maximum pressure (Pmax_actual), and the actual oxygen amount ($O_2$_actual) S1017. The air-fuel ratio (AF) may also be considered in the calculation of the actual combustion maximum temperature (Temp_actual).

An actual NOx exhaust amount ([NOx]_actual) may be calculated based on the actual combustion maximum temperature (Temp_actual) and the actual oxygen amount ($O_2$_actual) S1018. The actual NOx exhaust amount ([NOx]_ actual) may be determined by considering a start of injection (SOD, a rail pressure (injection pressure; RAIL), an auxiliary injection (Pilot), and total Fuel amount (Q) with the actual combustion maximum temperature (Temp_actual) and the actual oxygen amount ($O_2$_actual). Then, a difference value ([NOx]_dvt) between the calculated actual NOx exhaust amount ([NOx]_actual) and the calculated reference NOx exhaust amount ([NOx]_ref) may be calculated S1019.

Figure 4:
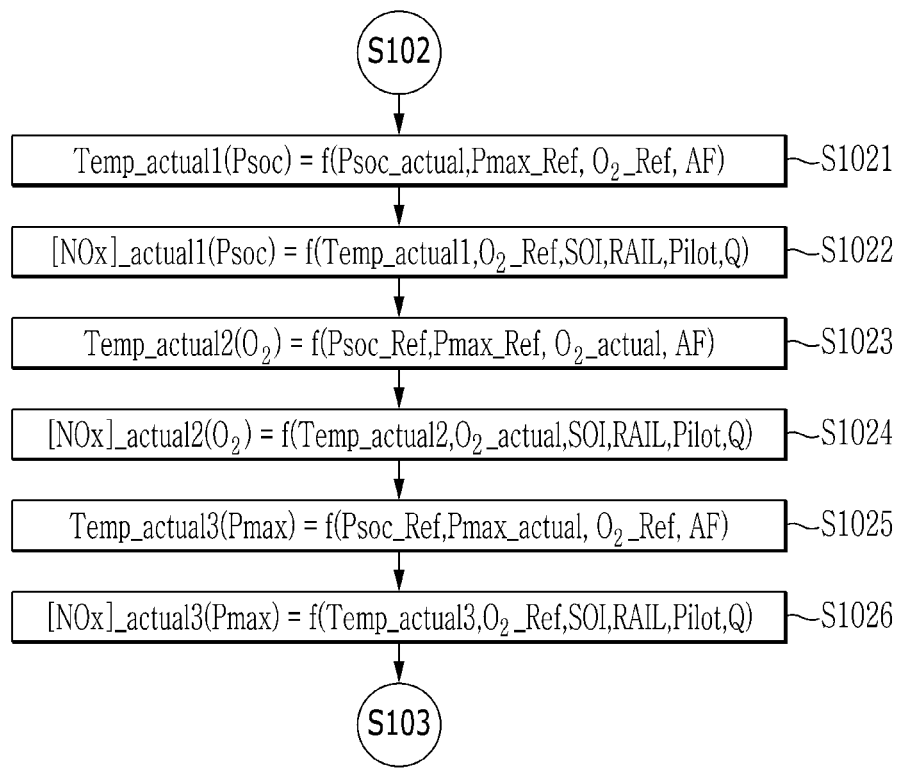
FIG. 4 is a flowchart illustrating a specific method of analyzing influence of the in-cylinder pressure at a start time of combustion, an oxygen amount in EGR gas, and a fuel injection timing according to the exemplary embodiment of the present invention shown in FIG. 2.

FIG. 4 is a flowchart illustrating a specific method of analyzing influence of the in-cylinder pressure at a start time of combustion, an oxygen amount in EGR gas, and a fuel injection timing according to the exemplary embodiment of the present invention shown in FIG. 2. Referring to FIG. 4, in the analysis of the influence of the in-cylinder pressure at a start time of combustion, an oxygen amount in EGR gas, and a fuel injection timing, firstly, a first actual flame temperature at the in-cylinder pressure at the start time of combustion (Temp_actual1(Psoc)) may be calculated based on the in-cylinder pressure at the start time of the actual combustion (Psoc_actual), the reference combustion maximum pressure (Pmax_Ref), and the reference oxygen amount ($O_2$_Ref) S1021. The air-fuel ratio AF may also be considered in the calculation of the first actual flame temperature (Temp_actual 1 (Psoc)).

Additionally, a first actual NOx exhaust amount at the in-cylinder pressure at the start time of combustion ([NOx]_actual(Psoc)) may be calculated based on the first actual flame temperature (Temp_actual1) and the reference oxygen amount ($O_2$_Ref) S1022. The first actual NOx exhaust amount ([NOx]_actual1(Psoc)) may be determined based on a start of injection (SOI), a rail pressure (injection pressure; RAIL), an auxiliary injection (Pilot), and total Fuel amount (Q). Then, a second actual flame temperature at the actual oxygen amount (Temp_actual2($O_2$)) may be calculated based on the in-cylinder pressure at the reference combustion start time (Psoc_Ref), the reference combustion maximum pressure (Pmax_Ref), and the actual oxygen amount ($O_2$_actual) S1023. The air-fuel ratio AF may be considered in the calculation of the second actual flame temperature (Temp_actual2 ($O_2$)).

Then, a second actual NOx exhaust amount at the actual oxygen amount ([NOx]_actual2($O_2$)) may be calculated based on the second actual flame temperature (Temp_actual2) and the actual oxygen amount ($O_2$_actual) S1024. The second actual NOx exhaust amount ([NOx]_actual2($O_2$)) may be determined by considering a start of injection (SOI), a rail pressure (injection pressure; RAIL), an auxiliary injection (Pilot), and total Fuel amount (Q). Then, a third actual flame temperature at the actual combustion maximum pressure (Temp_actual3(Pmax)) may be calculated based on the in-cylinder pressure at the reference combustion start time (Psoc_Ref) and the actual combustion maximum pressure (Pmax_actual) S1025. The air-fuel ratio AF may also be considered in the calculation of the third actual flame temperature (Temp_actual3(Pmax)). A third actual NOx exhaust amount at the actual combustion maximum pressure ([NOx]_actual3(Pmax)) may be calculated based on the third actual flame temperature (Temp_actual3) and the reference oxygen amount ($O_2$_Ref) S1026. The third actual NOx exhaust amount ([NOx]_actual3(Pmax)) may be determined by considering a start of injection (SOI), a rail pressure (injection pressure; RAIL), an auxiliary injection (Pilot), and total Fuel amount (Q).

Figure 5:
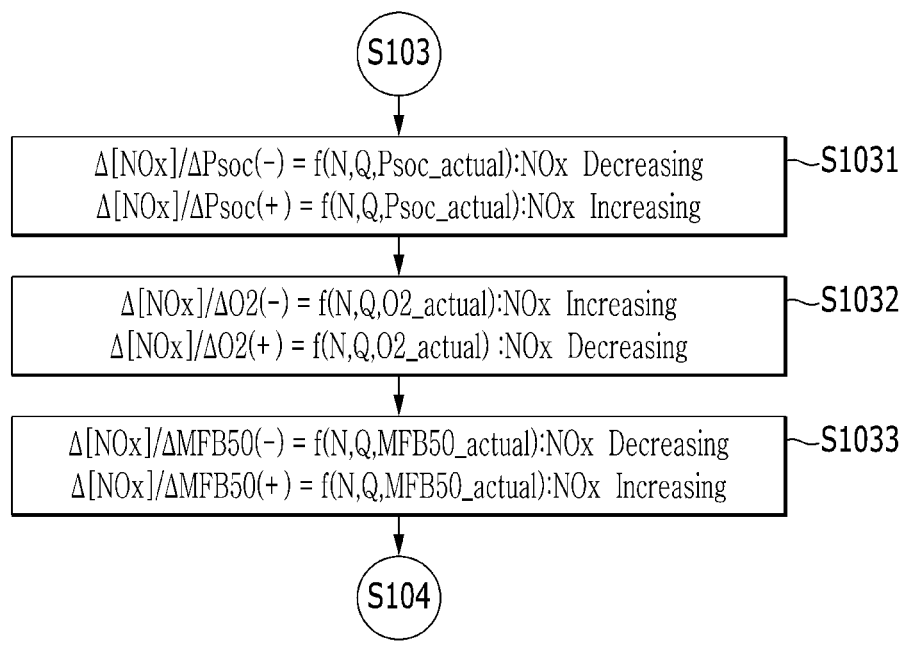
FIG. 5 is a flowchart illustrating a specific method of calculating a rate of change in the NOx according to change in the in-cylinder pressure at the start time of combustion, the oxygen amount in the EGR gas, and the fuel injection timing according to the exemplary embodiment of the present invention shown in FIG. 2.

FIG. 5 is a flowchart illustrating a specific method of calculating a rate of change in the NOx according to change in the in-cylinder pressure at the start time of combustion, the oxygen amount in the EGR gas, and the fuel injection timing according to the exemplary embodiment of the present invention shown in FIG. 2.

Referring to FIG. 5, in the calculating a rate of change in the NOx according to change in the in-cylinder pressure at the start time of combustion, a change amount of the actual NOx exhaust amount with respect to a change amount of the in-cylinder pressure at the actual combustion start time ($\Delta$[NOx]/$\Delta$[Psoc]) may be calculated S1031. The change amount of the actual NOx exhaust amount with respect to a change amount of the in-cylinder pressure at the actual combustion start time ($\Delta$[NOx]/$\Delta$[Psoc]) may be determined based on the engine speed N, the total fuel amount Q, the in-cylinder pressure at the start time of actual combustion (Psoc_actual).

The change amount of the actual NOx exhaust amount with respect to a change amount of the in-cylinder pressure at the actual combustion start time ($\Delta$[NOx]/$\Delta$[Psoc]) may be calculated based on when the change amount in the in-cylinder pressure at the actual combustion start timing is positive (+) or negative (−), to calculate how much the actual NOx exhaust amount may be changed with respect to the change amount of the in-cylinder pressure at the start time of actual combustion.

Further, a change amount of the actual NOx exhaust amount with respect to a change amount of the actual oxygen amount ($\Delta$[NOx]/$\Delta$[O$_2$]) may be calculated S1032. The change amount of the actual NOx exhaust amount with respect to a change amount of the actual oxygen amount ($\Delta$[NOx]/$\Delta$[O$_2$]) may be determined based on the engine speed N, the total fuel amount Q, the actual oxygen amount (O$_2$_actual). How much the change amount of the actual NOx exhaust amount with respect to a change amount of the actual oxygen amount may be changed may be calculated based on whether the actual oxygen amount (O$_2$_actual) is positive (+) or negative (−).

A change amount of the actual NOx exhaust amount with respect to a change amount of the actual injection timing (($\Delta$[NOx]/$\Delta$MFB50)) may be calculated S1033. The change amount of the actual NOx exhaust amount with respect to a change amount of the actual injection timing (($\Delta$[NOx]/$\Delta$MFB50)) may be determined based on the engine speed N, the total fuel amount Q, the actual injection timing (MFB50_actual). Additionally, how much the change amount of the actual NOx exhaust amount with respect to a change amount of the actual injection timing (($\Delta$[NOx]/$\Delta$MFB50)) may be changed based on whether the change amount of the actual injection timing is positive (+) or negative (−) may then be calculated.

Figure 6:
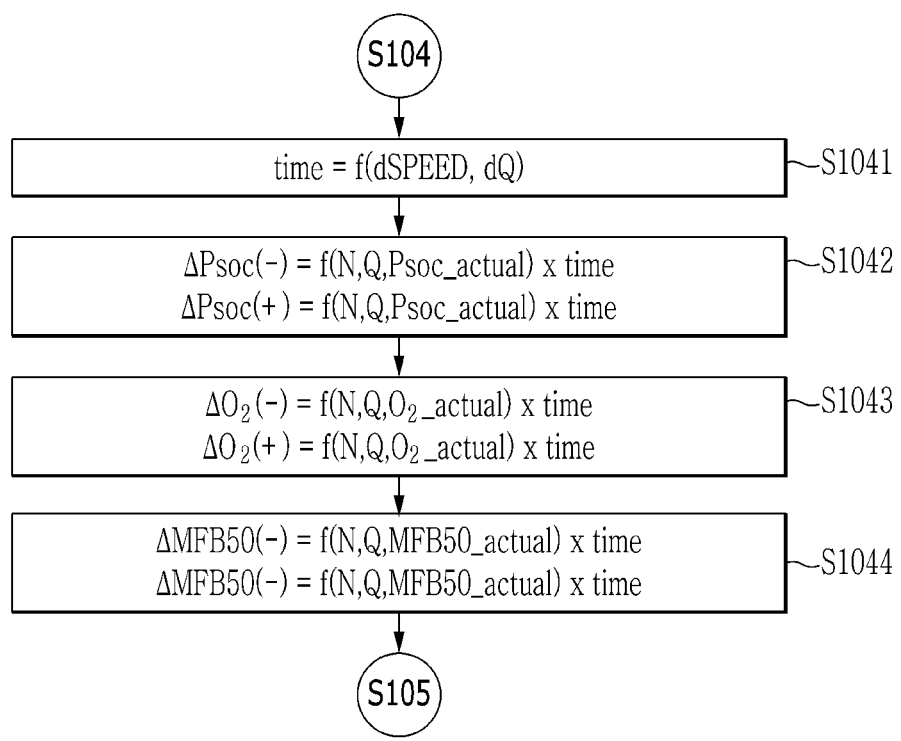
FIG. 6 is a flowchart illustrating a specific method of calculating variation width that may be changed in a unit time per the in-cylinder pressure at the combustion start time, the oxygen amount in the EGR gas, and the fuel injection timing according to the exemplary embodiment of the present invention shown in FIG. 2.

FIG. 6 is a flowchart illustrating a specific method of calculating variation width that may be changed in a unit time per the in-cylinder pressure at the combustion start time, the oxygen amount in the EGR gas, and the fuel injection timing according to the exemplary embodiment of the present invention shown in FIG. 2. Referring to FIG. 6, in the calculating variation width that may be changed in a unit time per the in-cylinder pressure at the combustion start time, the oxygen amount in the EGR gas, and the fuel injection timing, firstly, time may be calculated based on vehicle speed per unit time (dSPEED) and fuel consumption per unit time (dQ) S1041.

A rate of change of the in-cylinder pressure at the start time of combustion may then be calculated based on an engine speed (N), a total fuel amount (Q), and the in-cylinder pressure at the start time of the actual combustion (Psoc_actual), and the change amount in the in-cylinder pressure at the start time of combustion ($\Delta$Psoc) may be calculated by multiplying the time by the rate of change of the in-cylinder pressure at the start time of combustion S1042. A rate of change of the actual oxygen amount may be calculated based on the engine speed (N), the total fuel amount (Q), and the actual oxygen amount (O$_2$_actual), and a change amount of the oxygen amount ($\Delta$O$_2$) may be calculated by multiplying the time by the rate of change of the actual oxygen amount S1043. Then, a rate of change of an actual injection timing is calculated based on the engine speed (N), the total fuel amount (Q), and the actual injection timing (MFB50_actual), and a change amount of the injection timing ($\Delta$MFB50) may be calculated by multiplying the time by the rate of change of an actual injection timing S1044.

Figure 7:
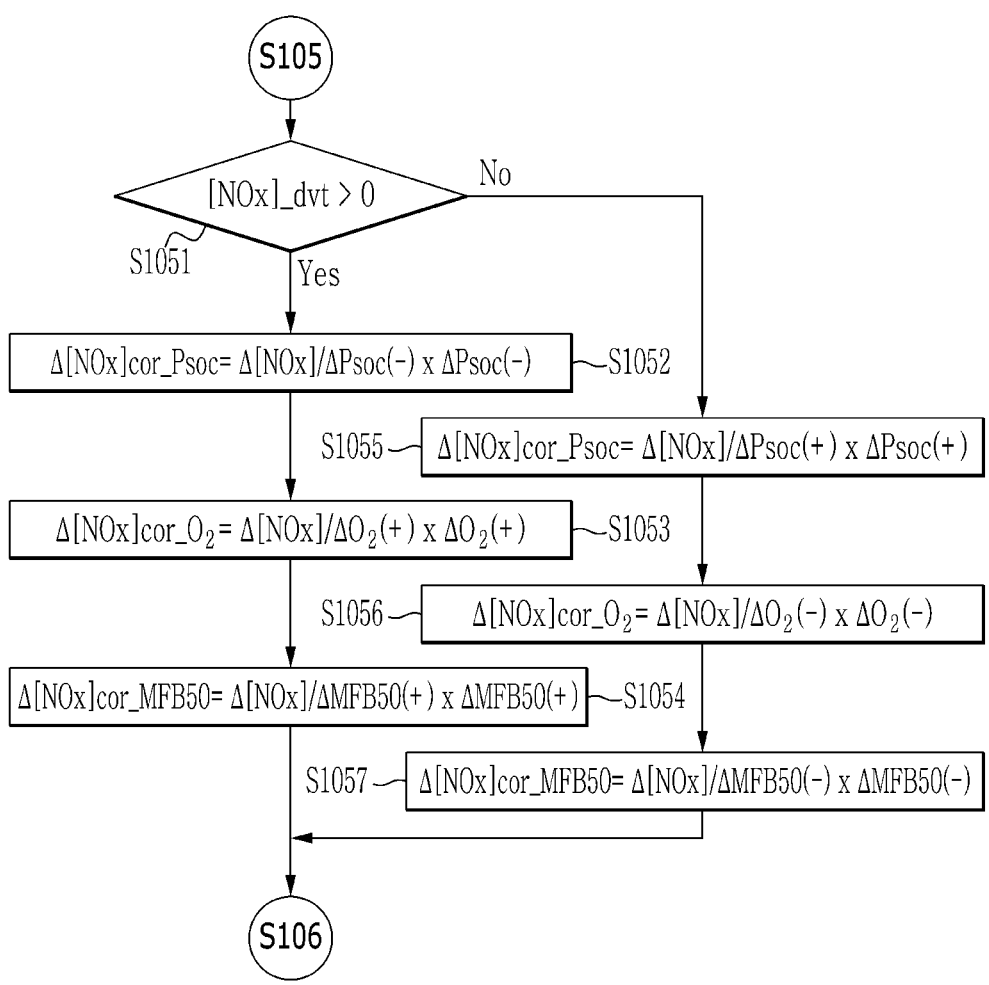
FIG. 7 is a flowchart illustrating a specific method of calculating a NOx value adjustment amount that may be changed in the unit time based on the influence of the in-cylinder pressure at the combustion start time, the oxygen amount in the EGR gas, and the fuel injection timing according to the exemplary embodiment of the present invention shown in FIG. 2.

FIG. 7 is a flowchart illustrating a specific method of calculating a NOx value adjustment amount that may be changed in the unit time in consideration of the influence of the in-cylinder pressure at the combustion start time, the oxygen amount in the EGR gas, and the fuel injection timing according to the exemplary embodiment of the present invention shown in FIG. 2. Referring to FIG. 7, in the calculating a NOx value adjustment amount that may be changed in the unit time in consideration of the influence of the in-cylinder pressure at the combustion start time, the oxygen amount in the EGR gas, and the fuel injection timing S105, firstly, whether a difference value between the actual NOx exhaust amount and the reference NOx exhaust amount ([NOx]_dvt) is greater than 0 may be determined S 1051.

When the difference value between the actual NOx exhaust amount and the reference NOx exhaust amount ([NOx]_dvt) is greater than 0, the NOx value adjustment amount that may be changed in unit time based on the in-cylinder pressure at the start time of combustion ($\Delta$[NOx] cor_Psoc) may be determined by multiplying the NOx change amount by the change amount of the in-cylinder pressure at the start time of combustion ($\Delta$[NOx]/$\Delta$Psoc(−)) by the minimum change amount of the in-cylinder pressure at the start time of combustion ($\Delta$Psoc(−)) S1052.

Further, the NOx value adjustment amount that may be changed in unit time considering the oxygen amount ($\Delta$[NOx]cor_O$_2$) may be determined by multiplying the NOx change amount by the oxygen amount change amount ($\Delta$[NOx]/$\Delta$O$_2$(+)) by the maximum change amount of the oxygen amount ($\Delta$O$_2$(+)) S1053. Further, the NOx value adjustment amount that may be changed in unit time considering the injection timing ($\Delta$[NOx]cor_MFB50) may be determined by multiplying the NOx change amount by the injection amount change amount ($\Delta$[NOx]/$\Delta$MFB50(+)) by the maximum change amount of the injection time ($\Delta$MFB50(+)) S1054.

When the difference between the actual NOx exhaust amount and the reference NOx exhaust amount is less than 0, the NOx value adjustment amount that may be changed in unit time considering the in-cylinder pressure at the start time of combustion ($\Delta$[NOx]cor_Psoc) may be determined by multiplying the NOx change amount by the change amount of the in-cylinder pressure at the start time of combustion ($\Delta$[NOx]/$\Delta$Psoc(+)) by the maximum change amount of the in-cylinder pressure at the start time of combustion ($\Delta$Psoc(+)) S1055. Further, the NOx value adjustment amount that may be changed in unit time considering the oxygen amount ($\Delta[NOx]cor\_O_2$) may be determined by multiplying the NOx change amount by the oxygen amount change amount ($\Delta[NOx]/\Delta O_2(+)$) by the minimum change amount of the oxygen amount ($\Delta O_2(-)$) S1056. The NOx value adjustment amount that may be changed in unit time considering the injection timing ($\Delta[NOx]cor\_MFB50$) may then be determined by multiplying the NOx change amount by the injection amount change amount ($\Delta[NOx]/\Delta MFB50(-)$) by the minimum change amount of the injection time ($\Delta MFB50(-)$) S1057.

Figure 8:
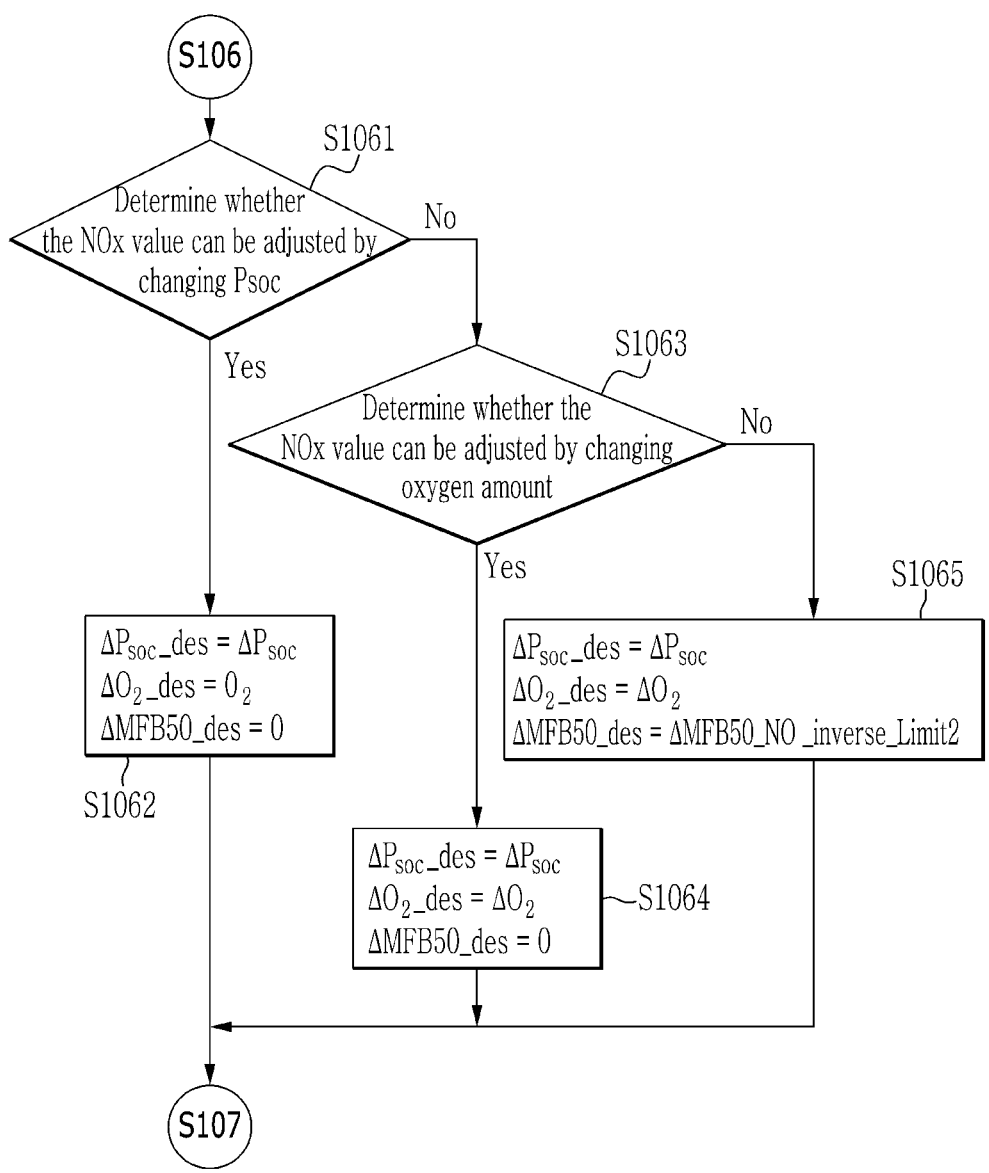
FIG. 8 is a flowchart illustrating a specific method of adjusting the NOx value according to the NOx value adjustment amount and determining a NOx final value according to an exemplary embodiment of the present invention shown in FIG. 2.

FIG. 8 is a flowchart illustrating a specific method of adjusting the NOx value according to the NOx value adjustment amount and determining a NOx final value according to an exemplary embodiment of the present invention shown in FIG. 2. Referring to FIG. 8, in adjusting the NOx value according to the NOx value adjustment amount and determining a NOx final value S106, firstly, whether the NOx value may be adjusted by changing the in-cylinder pressure at the start time of combustion (Psoc) may be determined S1061.

When the NOx value may be adjusted by changing the in-cylinder pressure at the start time of combustion (Psoc), the desired change amount of the in-cylinder pressure at the combustion start time ($\Delta Psoc\_des$) may be determined to be equal to the change amount of the in-cylinder pressure at the combustion start time ($\Delta Psoc$), the desired oxygen change amount ($\Delta O_2\_des$) may be determined to be zero, and the desired injection timing change amount ($\Delta MFB50\_des$) may be determined to be 0 S1062. When the NOx value is unable to be adjusted by changing the in-cylinder pressure at the start time of combustion whether the NOx value may be adjusted by changing the in-cylinder pressure (Psoc) and the oxygen amount ($O_2$) at the start of combustion may be determined S1063.

When the NOx value may be adjusted by changing the in-cylinder pressure (Psoc) and the oxygen amount ($O_2$) at the start of combustion, the desired change amount of the in-cylinder pressure at the combustion start time ($\Delta Psoc\_des$) may be determined to be equal to the change amount of the in-cylinder pressure at the combustion start time ($\Delta Psoc$), the desired oxygen change amount ($\Delta O_2\_des$) may be determined to be current oxygen change amount ($\Delta O_2$), and the desired injection timing change amount ($\Delta MFB50\_des$) may be determined to be 0 S1064.

When the NOx value is unable to be adjusted by changing the in-cylinder pressure (Psoc) and the oxygen amount ($O_2$) at the start of combustion, the desired change amount of the in-cylinder pressure at the combustion start time ($\Delta Psoc\_des$) may be determined to be equal to the change amount of the in-cylinder pressure at the combustion start time ($\Delta Psoc$), the desired oxygen change amount ($\Delta O_2\_des$) may be determined to be current oxygen change amount ($\Delta O_2$), the desired injection timing change amount ($\Delta MFB50\_des$) may be calculated by calculating the difference between the NOx change amount and the NOx shift amount due to the in-cylinder pressure at the start time of combustion and the oxygen amount and inversely calculating the injection timing change amount with respect to the difference, the actual injection timing, the engine speed, and the load ($\Delta MFB50\_NO\_inverse\_limit2$) S1065. Meanwhile, the injection timing change amount ($\Delta MFB50$) may be limited by comparison with a changeable threshold value, and may finally be determined in consideration of the fuel consumption deterioration limit value.

Figure 9:
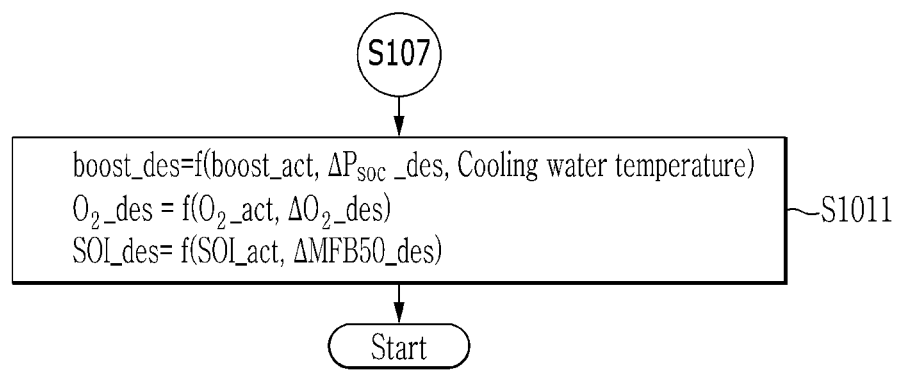
FIG. 9 is a flowchart illustrating a specific method of determining a target boost pressure, a target oxygen amount, and a target fuel injection timing to provide a final command signal according to an exemplary embodiment of the present invention shown in FIG. 2.

FIG. 9 is a flowchart illustrating a specific method of determining a target boost pressure, a target oxygen amount, and a target fuel injection timing to provide a final command signal according to an exemplary embodiment of the present invention shown in FIG. 2.

Referring to FIG. 9, the determining a target boost pressure, a target oxygen amount, and a target fuel injection timing to provide a final command signal S107 may include determining the target boost pressure (boost_des) based on an actual boost pressure (boost_act), the change amount of the desired in-cylinder pressure at the start time of the combustion ($\Delta Psoc\_des$), and the cooling water temperature, determining the target oxygen amount ($O_2\_des$) based on the actual oxygen amount ($O_2\_act$) and the desired oxygen change amount ($\Delta O_2\_des$), and determining the desired target injection timing (SOI_des) in consideration of an actual injection timing (SOI_act) and the desired injection timing change amount ($\Delta MFB50\_des$). According to an exemplary embodiment of the present invention, it may be possible to operate the engine in real time to be able to respond to EM regulation by predicting the amount of the NOx in real time without a separate exhaust analyzing device or a NOx measuring sensor using the combustion pressure and engine operating parameters and the engine may be operated based on the predicted amount of NOx.

While this invention has been described in connection with what is presently considered to be practical exemplary embodiments, it is to be understood that the invention is not limited to the disclosed exemplary embodiments. On the contrary, it is intended to cover various modifications and equivalent arrangements included within the spirit and scope of the appended claims.

What is claimed is:

1. A method of predicting and controlling NOx generation amount, comprising:
    calculating, by a controller, a difference between an actual NOx exhaust amount and a reference NOx exhaust amount;
    analyzing, by the controller, influence of the in-cylinder pressure at a start time of combustion, an oxygen amount in EGR gas, and a fuel injection timing;
    calculating, by the controller, a rate of change in the NOx based on a change in the in-cylinder pressure at the start time of combustion, the oxygen amount in the EGR gas, and the fuel injection timing;
    calculating, by the controller, variation width changeable in a unit time per the in-cylinder pressure at the combustion start time, the oxygen amount in the EGR gas, and the fuel injection timing;
    calculating, by the controller, a NOx value adjustment amount changeable in the unit time based on the influence of the in-cylinder pressure at the combustion start time, the oxygen amount in the EGR gas, and the fuel injection timing;
    adjusting, by the controller, the NOx value based on the NOx value adjustment amount and determining a NOx final value; and
    determining, by the controller, a target boost pressure, a target oxygen amount, and a target fuel injection timing to provide a final command signal.

2. The method of predicting and controlling NOx generation amount of claim 1, wherein calculating a difference between an actual NOx exhaust amount and a reference NOx exhaust amount includes:
    determining, by the controller, reference oxygen amount, an in-cylinder pressure at the start time of a reference combustion, a reference injection timing, and a reference combustion maximum pressure;

calculating, by the controller, a reference combustion maximum temperature based on the in-cylinder pressure at the reference combustion start time, the reference combustion maximum pressure, and the reference oxygen amount;

determining, by the controller, a reference NOx exhaust amount based on the reference combustion maximum temperature and the reference oxygen amount;

calculating, by the controller, a difference value between an actual oxygen amount and the reference oxygen amount;

calculating, by the controller, a difference value between an in-cylinder pressure at the start time of actual combustion and the in-cylinder pressure at the start time of the reference combustion;

calculating, by the controller, a difference value between an actual injection timing and the reference injection timing;

calculating, by the controller, an actual combustion maximum temperature based on the in-cylinder pressure at the actual combustion start time, an actual combustion maximum pressure, and the actual oxygen amount;

calculating, by the controller, an actual NOx exhaust amount based on the actual combustion maximum temperature and the actual oxygen amount; and calculating, by the controller, a difference value between the calculated actual NOx exhaust amount and the calculated reference NOx exhaust amount.

3. The method of predicting and controlling NOx generation amount of claim 2, wherein analyzing influence of the in-cylinder pressure at a start time of combustion, an oxygen amount in EGR gas, and a fuel injection timing includes:

calculating, by the controller, a first actual flame temperature at the in-cylinder pressure at the start time of combustion based on the in-cylinder pressure at the start time of the actual combustion, the reference combustion maximum pressure, and the reference oxygen amount;

calculating, by the controller, a first actual NOx exhaust amount at the in-cylinder pressure at the start time of combustion based on the first actual flame temperature and the reference oxygen amount;

calculating, by the controller, a second actual flame temperature at the actual oxygen amount based on the in-cylinder pressure at the reference combustion start time, the reference combustion maximum pressure, and the actual oxygen amount;

calculating, by the controller, a second actual NOx exhaust amount at the actual oxygen amount based on the second actual flame temperature and the actual oxygen amount;

calculating, by the controller, a third actual flame temperature at the actual combustion maximum pressure based on the in-cylinder pressure at the reference combustion start time and the actual combustion maximum pressure; and calculating, by the controller, a third actual NOx exhaust amount at the actual combustion maximum pressure based on the third actual flame temperature and the reference oxygen amount.

4. The method of predicting and controlling NOx generation amount of claim 3, wherein calculating a rate of change in the NOx based on change in the in-cylinder pressure at the start time of combustion, the oxygen amount in the EGR gas, and the fuel injection timing includes:

calculating, by the controller, a change amount of the actual NOx exhaust amount with respect to a change amount of the in-cylinder pressure at the actual combustion start time;

calculating, by the controller, a change amount of the actual NOx exhaust amount with respect to a change amount of the actual oxygen amount; and calculating, by the controller, a change amount of the actual NOx exhaust amount with respect to a change amount of the actual injection timing.

5. The method of predicting and controlling NOx generation amount of claim 4, wherein calculating variation width changeable in a unit time per the in-cylinder pressure at the combustion start time, the oxygen amount in the EGR gas, and the fuel injection timing includes:

calculating, by the controller, time based on vehicle speed per unit time and fuel consumption per unit time;

calculating, by the controller, a rate of change of the in-cylinder pressure at the start time of combustion based on an engine speed, a total fuel amount, and the in-cylinder pressure at the start time of the actual combustion, and calculating the change amount in the in-cylinder pressure at the start time of combustion by multiplying the time by the rate of change of the in-cylinder pressure at the start time of combustion;

calculating, by the controller, a rate of change of the actual oxygen amount based on the engine speed, the total fuel amount, and the actual oxygen amount, and calculating a change amount of the oxygen amount by multiplying the time by the rate of change of the actual oxygen amount; and calculating, by the controller, a rate of change of an actual injection timing based on the engine speed, the total fuel amount, and the actual injection timing, and calculating a change amount of the injection timing by multiplying the time by the rate of change of an actual injection timing.

6. The method of predicting and controlling NOx generation amount of claim 5, wherein calculating a NOx value adjustment amount changeable in the unit time based on the influence of the in-cylinder pressure at the combustion start time, the oxygen amount in the EGR gas, and the fuel injection timing includes:

determining, by the controller, whether a difference value between the actual NOx exhaust amount and the reference NOx exhaust amount is greater than 0.

7. The method of predicting and controlling NOx generation amount of claim 6, wherein when the difference value between the actual NOx exhaust amount and the reference NOx exhaust amount is greater than 0:

the NOx value adjustment amount changeable in unit time based on the in-cylinder pressure at the start time of combustion is determined by multiplying the NOx change amount by the change amount of the in-cylinder pressure at the start time of combustion by the minimum change amount of the in-cylinder pressure at the start time of combustion, the NOx value adjustment amount changeable in unit time based on the oxygen amount is determined by multiplying the NOx change amount by the oxygen amount change amount by the maximum change amount of the oxygen amount, and the NOx value adjustment amount changeable in unit time based on the injection timing is determined by multiplying the NOx change amount by the injection amount change amount by the maximum change amount of the injection time.

8. The method of predicting and controlling NOx generation amount of claim 7, wherein when the difference between the actual NOx exhaust amount and the reference NOx exhaust amount is not greater than 0:

the NOx value adjustment amount changeable in unit time based the in-cylinder pressure at the start time of combustion is determined by multiplying the NOx change amount by the change amount of the in-cylinder pressure at the start time of combustion by the maximum change amount of the in-cylinder pressure at the start time of combustion, the NOx value adjustment amount changeable in unit time based on the oxygen amount is determined by multiplying the NOx change amount by the oxygen amount change amount by the minimum change amount of the oxygen amount, and the NOx value adjustment amount changeable in unit time based the injection timing is determined by multiplying the NOx change amount by the injection amount change amount by the minimum change amount of the injection time.

9. The method of predicting and controlling NOx generation amount of claim 8, wherein adjusting the NOx value according to the NOx value adjustment amount and determining a NOx final value includes:

determining, by the controller, whether the NOx value is adjustable by changing the in-cylinder pressure at the start time of combustion; and when the NOx value is adjustable by changing the in-cylinder pressure at the start time of combustion, the desired change amount of the in-cylinder pressure at the combustion start time is determined to be equal to the change amount of the in-cylinder pressure at the combustion start time, the desired oxygen change amount is determined to be zero, and the desired injection timing change amount is determined to be 0.

10. The method of predicting and controlling NOx generation amount of claim 9, wherein adjusting the NOx value according to the NOx value adjustment amount and determining a NOx final value includes:

when the NOx value is not adjustable by changing the in-cylinder pressure at the start time of combustion, determining, by the controller, whether the NOx value is adjustable by changing the in-cylinder pressure and the oxygen amount at the start of combustion; and when the NOx value is adjustable by changing the in-cylinder pressure and the oxygen amount at the start of combustion, the desired change amount of the in-cylinder pressure at the combustion start time is determined to be equal to the change amount of the in-cylinder pressure at the combustion start time, the desired oxygen change amount is determined to be current oxygen change amount, and the desired injection timing change amount is determined to be 0.

11. The method of predicting and controlling NOx generation amount of claim 10, wherein when the NOx value is not adjustable by changing the in-cylinder pressure and the oxygen amount at the start of combustion:

the desired change amount of the in-cylinder pressure at the combustion start time is determined to be equal to the change amount of the in-cylinder pressure at the combustion start time, the desired oxygen change amount is determined to be current oxygen change amount, and the desired injection timing change amount is calculated by calculating the difference between the NOx change amount and the NOx shift amount due to the in-cylinder pressure at the start time of combustion and the oxygen amount and inversely calculating the injection timing change amount with respect to the difference, the actual injection timing, the engine speed, and the load.

12. The method of predicting and controlling NOx generation amount of claim 11, wherein the injection timing change amount is limited through comparison with a changeable threshold value, and is finally determined based on the fuel consumption deterioration limit value.

13. The method of predicting and controlling NOx generation amount of claim 12, wherein determining a target boost pressure, a target oxygen amount, and a target fuel injection timing to provide a final command signal includes:

determining, by the controller, the target boost pressure based on an actual boost pressure, the change amount of the desired in-cylinder pressure at the start time of the combustion, and the cooling water temperature;

determining, by the controller, the target oxygen amount in consideration of the actual oxygen amount and the desired oxygen change amount; and determining, by the controller, the desired target injection timing based on an actual injection timing and the desired injection timing change amount.

* * * * *